May 19, 1953  A. N. GLEYZAL  2,639,089
ELECTRICAL CALCULATOR
Filed June 3, 1949  2 Sheets-Sheet 1
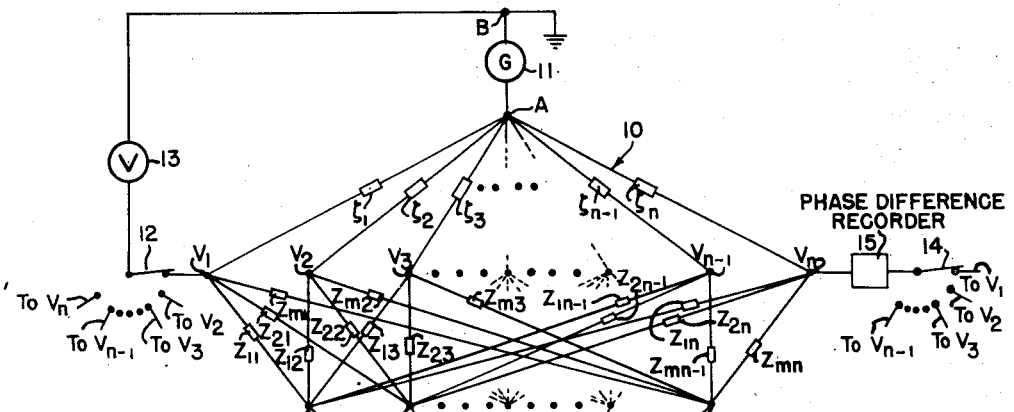
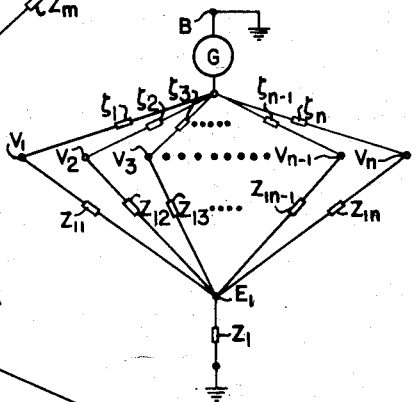
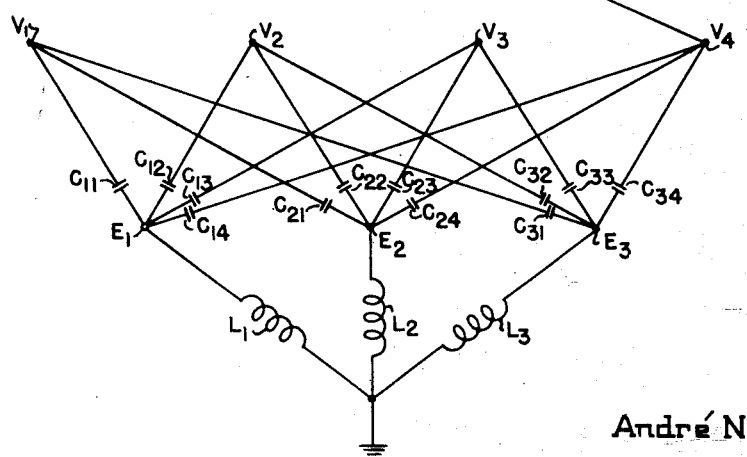
INVENTOR.
André Noël Gleyzal
BY
*M. O. Hayes*
ATTORNEY.

May 19, 1953  A. N. GLEYZAL  2,639,089
ELECTRICAL CALCULATOR

Filed June 3, 1949  2 Sheets-Sheet 2

INVENTOR.
André Noël Gleyzal
BY
M. O. Hayes
ATTORNEY.

Patented May 19, 1953

2,639,089

UNITED STATES PATENT OFFICE 2,639,089

ELECTRICAL CALCULATOR

André Noël Gleyzal, Cleveland, Ohio

Application June 3, 1949, Serial No. 97,067

6 Claims. (Cl. 235—61)

(Granted under Title 35, U. S. Code (1952), sec. 266)

This invention relates to calculating systems and more specifically to an electrical calculating system or solving simultaneous algebraic or partial differential equations with real or complex coefficients, which are constants or functions of a parameter $p$ or the differential operator $$\frac{d}{dt}$$

An important object of the invention is to provide an electrical calculating network which will solve simultaneous linear algebraic equations where the coefficients are functions of the differential operator with respect to time, usually denoted by $p=d/dt$. Such a network may also be employed as the dynamic analog of any system whose properties can be described by a set of partial differential equations linear in the dependent variables.

The initial or boundary conditions of the problems will become initial or boundary conditions on the electrical circuit. For example, the voltages on certain junction points may be specified at time $t=0$.

By employing electronic devices or servomechanisms to obtain a voltage which is the product of two other voltages non-linear partial differential equations may also be solved. Thus dynamic analogs of wide variety are possible with these devices and the circuits shown in this disclosure.

An important object of the invention is to provide a calculating system which is almost instantaneous in operation and which requires only a minimum of computations to determine the values of the electrical elements of the system for any given set of equations.

Another object of the invention is the provision of a calculating system which can easily be set up and operated using standard equipment and ordinary skill.

A further object of the invention is to provide an electronic device which forms an impedance element having an impedance which is any predetermined positive or negative multiple of another impedance element.

Other objects and many of the attendant advantages of this invention will be readily appreciated as the same becomes better understood by reference to the following detailed description when considered in connection with the accompanying drawings wherein:

Figure 1 is a diagrammatic view of an electrical calculating network forming one embodiment of the invention.

Figure 2 is a diagrammatic view of a circuit forming a typical part of the electrical calculating network shown in Figure 1.

Figure 3 is a diagrammatic view of an electrical calculating circuit forming a particular embodiment of the invention shown in Figure 1.

Figure 4:
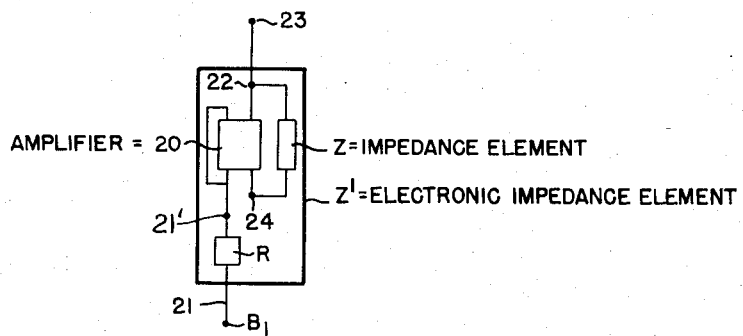
Figure 4 is a diagrammatic view of a novel electronic impedance element which may form a part of the electrical calculating network.

In Figure 1 of the drawings wherein similar reference characters denote corresponding parts throughout the views, 10 designates the electrical network including a first set of junction points $V_1, V_2, \ldots, V_n$ one for each variable of $m$ linear algebraic equations; a second set of junction points $E_1, E_2, \ldots, E_m$ one for each of the equations; impedance elements $Z_{11}, Z_{12}, \ldots, Z_{mn}$ one for each coefficient of the equations directly connecting each of said junction points $V_1, V_2, \ldots, V_n$ with each junction point $E_1, E_2, \ldots, E_m$; a source 11 of voltage; impedance elements $\zeta_1, \zeta_2, \ldots, \zeta_n$ directly connecting junction points $V_1, V_2, \ldots, V_n$ with one terminal A of the voltage source; and impedance elements $Z_1, Z_2, \ldots, Z_m$ directly connecting each junction points $E_1, E_2, \ldots, E_m$ with the other terminal B of the voltage source. Connected between the terminal B and any one of the junction points $V_1, V_2, \ldots, V_n$, as by a switch 12, is any suitable voltmeter 13. Selectively connected between one junction point $V_n$ and any other one of the junction points $V_1, V_2, \ldots, V_{n-1}$, as by switch 14 is a suitable phase difference indicator 15. The reciprocal of the impedance $Z_1$ is chosen equal to the negative of the sum of the reciprocals of the impedances $Z_{11}, Z_{12}, \ldots, Z_{1n}$; similarly the reciprocal of the impedance $Z_2$ is chosen equal to the negative of the sum of the reciprocals of the impedances $Z_{21}, Z_{22}, \ldots, Z_{2n}$, etc.; and the reciprocal of the impedance $Z_m$ is chosen equal to the negative of the sums of the reciprocals of the impedances $Z_{m1}, Z_{m2}, \ldots, Z_{mn}$.

Consider, for example, the circuit shown in Figure 2, and let $V_1, V_2, \ldots, V_n$ be the voltages respectively between points $V_1, V_2, \ldots, V_n$ and the ground terminal B, let $E_1$ be the voltage between point $E_1$ and the ground terminal B; and let $Z_1, Z_{11}, \ldots, Z_{1n}$ be the impedances of the impedance elements $Z_1, Z_{11}, \ldots, Z_{1n}$. By Kirchhoff's law the voltages $V_1, V_2, \ldots, V_n$ are related by the following equation:

$$\frac{V_1 - E_1}{Z_{11}} + \frac{V_2 - E_1}{Z_{12}} + \frac{V_3 - E_1}{Z_{13}} + \cdots + \frac{V_{n-1} - E_1}{Z_{1n-1}} + \frac{V_n - E_1}{Z_{1n}} = \frac{E_1}{Z_1}$$

The impedance $Z_1$ may be so chosen that $$\frac{1}{Z_1}+\frac{1}{Z_{11}}+\frac{1}{Z_{12}}+\frac{1}{Z_{13}}+ \ldots +\frac{1}{Z_{1n-1}}+\frac{1}{Z_{1n}}=0 \quad (X)$$

It then follows that $$\frac{V_1}{Z_{11}}+\frac{V_2}{Z_{12}}+\frac{V_3}{Z_{13}}+ \ldots +\frac{V_{n-1}}{Z_{1n-1}}+\frac{V_n}{Z_{1n}}=0$$

As the impedances of the impedance elements $\zeta_1, \zeta_2, \ldots, \zeta_n$ are varied, the resultant voltages $V_1, V_2, \ldots, V_n$ relative to ground at junction points $V_1, V_2, \ldots, V_n$ respectively constitute solutions of the last-mentioned linear algebraic equation.

The voltages $V_1, V_2, \ldots, V_n$ may be considered to be the $n$ variables of a set of $m$ linear homogeneous algebraic equations, such as:

$$\frac{V_1}{Z_{11}}+\frac{V_2}{Z_{12}}+ \ldots +\frac{V_n}{Z_{1n}}=0 \quad (1)$$

$$\frac{V_1}{Z_{21}}+\frac{V_2}{Z_{22}}+ \ldots +\frac{V_n}{Z_{2n}}=0 \quad (2)$$

$$\cdot \quad \cdot \quad \cdot \quad \cdot \quad \cdot \quad \cdot$$
$$\cdot \quad \cdot \quad \cdot \quad \cdot \quad \cdot \quad \cdot$$
$$\cdot \quad \cdot \quad \cdot \quad \cdot \quad \cdot \quad \cdot$$

$$\frac{V_1}{Z_{m1}}+\frac{V_2}{Z_{m2}}+ \ldots +\frac{V_n}{Z_{mn}}=0 \quad (m)$$

Circuits such as the one shown in Figure 2 may be set up, one for each equation and the points $V_1, V_2, \ldots, V_n$ respectively connected.

The voltages $V_1, \ldots, V_n$ constituting solutions may be read by a suitable instrument at the junction points $V_1, \ldots, V_n$. Figure 1 shows an electrical network for solving the general case of $m$ linear homogeneous algebraic equations, in $n$ variables. For a set of non-homogeneous linear algebraic equations, the impedances $\zeta_1, \ldots, \zeta_n$ of the impedance elements $\zeta_1, \ldots, \zeta_n$ or the output of the voltage source may be adjusted so that $V_n$ equals unity.

Where a sinusoidal source of voltage is used, capacitances, inductances, resistances or other suitable electrical devices may be used either singly or in combination as impedance elements. The impedance of such an impedance element is a real or complex number which varies with the frequency and so may be used in a network to correspond to a real or complex coefficient depending on a parameter $p$ in a set of equations provided the parameter is related to the frequency. Positive real coefficients may conveniently be represented by capacitances since $1/C$ is a positive quantity in the equation:

$$Z=1/C$$

where $Z$ represents the charge impedance of a capacitance element and $C$ is the capacity of the element. Negative real coefficients may conveniently be represented by inductances since $-1/L\omega^2$ is a negative quantity in the equation:

$$Z=-\frac{1}{L\omega^2}$$

where $Z$ represents the charge impedance of an inductance element, $L$ is the inductance of the element and $\omega$ is the frequency of the alternating voltage source. The charge impedance is the electrical analog impedance of the impedance presented in the mechanical displacement of an object.

The construction of a network for solving a specific set of three linear homogeneous algebraic equations in four variables will now be described.

As an example the following equations are selected:

$$.0101V_1+.0700V_2+.0600V_3+.0500V_4=0 \quad (1A)$$
$$.0025V_1+.0400V_2+.0054V_3+.0600V_4=0 \quad (2A)$$
$$.0002V_1+.0071V_2+.0600V_3+.1000V_4=0 \quad (3A)$$

These equations are a special case of Equations (1), ..., ($m$) solved by the network shown in Figure 1 where the number $n$ of variables is four and the number $m$ of equations is three. Consequently, an electrical network such as shown in Figure 3 is required. This network is a special case of the network shown in Figure 1 containing four junction points $V_1, \ldots, V_4$ and three junction points $E_1, \ldots, E_3$. Comparing Equations (1), ..., ($m$) with Equations (1A), ..., (3A), the coefficient $1/Z_{11}$ of $V_1$ in Equation (1) is identified with the coefficient .0101 of $V_1$ in Equation (1A). Thus $$\frac{1}{Z_{11}}=.0101$$

Similarly the coefficient $1/Z_{12}$ of $V_2$ in Equation (1) is identified with the coefficient .0700 of $V_2$ in Equation (1A). Thus $$\frac{1}{Z_{12}}=.0700$$

Likewise the remaining coefficients appearing in Equations (1A), ..., (3A) may be identified with coefficients appearing in Equations (1), ..., ($m$) when $n$ equals four and $m$ equals three. In the present example, a source 11A of alternating voltage having a frequency of 1000 C. P. S. is chosen.

Since all the coefficients in Equations (1A), (2A), (3A), are positive, it is convenient to use capacitances as impedance elements between points $V_1, \ldots, V_4$ and points $E_1, \ldots, E_3$ in Figure 3. In the example shown, these capacitances are formed by condensers $C_{11}, \ldots, C_{14}$; $C_{21}, \ldots, C_{24}$; and $C_{31}, \ldots, C_{34}$.

In order that the sum of the reciprocals of the impedances about each of the junction points $E_1, E_2, E_3$ be zero, in conformity with Equation (X), it will be necessary to choose negative impedances between points $E_1, E_2, E_3$ respectively and ground. For these "balancing" impedances it is convenient to use inductance elements $L_1, L_2, L_3$ as shown in Figure 3.

The impedance of the capacitance element $C_{11}$ is $$\frac{1}{Z_{11}}$$

which has been previously identified with the coefficient .0101 multiplying $V_1$ appearing in Equation (1A).

Thus $$C_{11}=\frac{1}{Z_{11}}=.0101$$

It is convenient to choose microfarads as units of capacity and therefore in accordance with this choice the condenser $C_{11}$ has a capacity of .0101 mf. Similarly the capacity of condenser $C_{12}$ corresponds to the coefficient multiplying $V_2$ in Equation (1A). Thus condenser $C_{12}$ has a capacity of .0700 mf. Likewise, the capacities in microfarads of the remaining condensers as shown in Figure 3 correspond each with one of the remaining coefficients appearing in Equations (1A), (2A), (3A).

The computation of the "balancing" impedance elements in accordance with Equation (1)

will now be described. Taking as an example $E_1$ as the junction point about which the impedances are to be balanced, the following equation must be satisfied:

$$-\frac{1}{L_1\omega^2}+C_{11}+C_{12}+C_{13}+C_{14}=0$$

where the circular frequency $\omega$ equals $2000\pi$ by selection of the alternating voltage source 11A. Therefore, in henries $$L_1=\frac{10^6}{\omega^2(C_{11}+C_{12}+C_{13}+C_{14})}$$
$$=\frac{10^6}{(2000)^2\pi^2(.0101+.0700+.0600+.0500)}$$
$$=.140$$

Similarly the values of the inductances $L_2$, $L_3$ may be computed so as to balance the impedances about junction points $E_2$, $E_3$ respectively. The values thus computed, in henries, are $$L_2=.247$$
$$L_3=.158$$

The network shown in Figure 3 conforms to the foregoing computations and represents the network constructed to solve Equations (1A), (2A), (3A). Upon energizing the network with an alternating voltage of 1000 C. P. S., voltage readings taken at points $V_1$, $V_2$, $V_3$, $V_4$ constitute a solution of Equations (1A), (2A), (3A). The solution will vary proportionately with the amplitude of the alternating voltage supplied by the source 11A. If this amplitude is so adjusted that the voltage at $V_4$ is unity, the voltages appearing at points $V_1$, $V_2$, $V_3$ constitute the solution of the non-homogeneous equations corresponding to Equations (1A), (2A), (3A) provided the proper signs of the variables $V_1$, $V_2$, $V_3$ are ascertained. If the voltage at point $V_1$ is in phase with that at point $V_4$, the sign of the variable $V_1$ is the same as that of the variable $V_4$. To determine the phase of the voltage at point $V_1$ with respect to that at point $V_4$, a voltmeter is inserted therebetween. If the sum of the voltages at point $V_1$ and at point $V_4$ equals the voltage between points $V_1$ and $V_4$, then the voltage at $V_1$ is out of phase with the voltage at $V_4$. If the difference of the voltages at point $V_1$ and at point $V_4$ is equal to the voltage between points $V_1$ and $V_4$, then the voltage at point $V_1$ is in phase with that at point $V_4$.

The following table shows the experimental values of $V_1$, $V_2$, $V_3$, $V_4$ obtained with the network of Figure 3 and gives the computed values obtained by solving Equations (1A), (2A), (3A).

|       | Experimental | Computed | Percentage Difference |
|-------|--------------|----------|----------------------|
| $V_1$ | 22.5         | 22.2     | 1.5                  |
| $V_2$ | $-2.77$      | $-2.69$  | $-2.8$               |
| $V_3$ | $-1.43$      | $-1.42$  | $-.5$                |

If the impedances of the other impedance elements are values which vary, for example with the frequency of the exciting voltage, it may be impossible by ordinary means to form such "balancing" impedance elements.

Instead of using ordinary balancing impedance elements $Z_1, Z_2, \ldots, Z_n$ in Figure 1, or ordinary balancing inductances $L_1, L_2, L_3$ in Figure 3, the electronic impedance element $Z'$ shown in Figure 4 may be employed. This impedance element $Z'$ may be so constructed that its impedance will balance the impedance of any given impedance element or combination of elements Z for all frequencies of a suitable range of frequencies.

The electronic impedance element $Z'$ comprises an amplifier 20 having a common input and ground terminal 21, an input terminal 22 connected to junction point 23, an output terminal 24 connected to one terminal of the impedance element Z whose other terminal is connected to the input terminal 22. Finally an impedance $R=-R_P/(1-\alpha)$ to cancel the plate impedance $R_P$ of the amplifier is connected in series between the terminal 21 and a point 21' in the line as shown.

If the impedance of the impedance element Z is Z and the amplification factor of the amplifier 20 is $\alpha$, the effective impedance of the electronic impedance element $Z'$ is $$Z'=\frac{V}{i}+R=\frac{V}{i}-\frac{R_P}{1-\alpha}$$

where $i$ is the current flowing through the electronic impedance element $Z'$ and V is the voltage at point 23 minus the voltage at point 21'. But the current $i$ is also equal to the current flowing through the impedance element Z. This current $i$ is $$i=\frac{V-\alpha V}{Z+R_P}$$

Therefore $$\frac{V}{i}=\frac{Z+R_P}{1-\alpha}$$

Therefore $$Z'=\frac{Z+R_P}{1-\alpha}-\frac{R_P}{1-\alpha}=\frac{Z}{1-\alpha}$$

It is clear that the above relationship holds regardless of whether or not the terminal $B_1$ is a ground terminal. Thus if $\alpha=2$, and $R=R_P$ the impedance of the electronic impedance element $Z'$ is the negative of the impedance of the element Z.

In order to balance the impedances for example about the junction point $E_1$ of Figure 1, it is only necessary to insert an electronic impedance element $Z'$, of the type shown in Figure 4, in the line between the selected junction point $E_1$ and point G, where the impedance Z of the impedance element Z is given by $$\frac{1}{Z}=\frac{1}{Z_{11}}+\frac{1}{Z_{12}}+\ldots+\frac{1}{Z_{1n}}$$

This is the relationship of impedances connected in parallel so that the impedance element $Z'$ can always be readily constructed.

It will therefore be clear that by choosing an amplification factor $\alpha=2$, the effective impedance of the electronic impedance element $Z'$ may be made equal to the negative of the arbitrary impedance of the impedance element Z.

Figure 5:
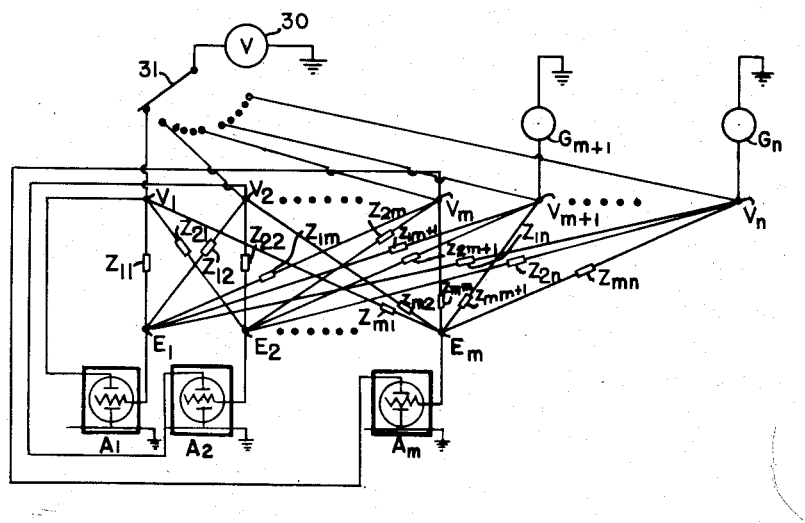
Figure 5 is a diagrammatic view showing an additional form of electrical calculating network.

Figure 5 shows an additional electrical network which may be used for solving linear algebraic equations. This network is similar to that shown in Figure 1 in that it includes junction points $V_1, V_2, \ldots, V_n$ one for each variable, junction points $E_1, E_2, \ldots, E_m$ one for each equation, and impedances $Z_{11} \ldots Z_{1n}, Z_{21} \ldots Z_{2n}, Z_{m1} \ldots Z_{mn}$ connecting the junction points $V_1, V_2, \ldots, V_n$ to the junction points $E_1, E_2, \ldots, E_m$ in every possible manner.

The voltages at points $E_1, E_2, \ldots, E_m$ are amplified by amplifiers $A_1, A_2, \ldots, A_m$ having their outputs respectively connected to points $V_1, V_2, \ldots, V_m$. If the amplification factor is $\alpha$, then $V_1 = aE_1$, $V_2 = aE_2$, $V_m = aE_m$. We assume the amplifiers to be of high input impedance relative to output impedance so that virtually no current passes thru the input terminal connected to $E_1$, $E_2$, ..., $E_m$. Hence, by Kirchhoff's laws applied at $E_1$, $E_2$, and $E_m$:

$$\frac{V_1 - \frac{V_1}{\alpha}}{Z_{11}} + \cdots + \frac{V_n - \frac{V_1}{\alpha}}{Z_{1n}} = 0$$

$$\frac{V_1 - \frac{V_2}{\alpha}}{Z_{21}} + \cdots + \frac{V_n - \frac{V_2}{\alpha}}{Z_{2n}} = 0$$

$$\cdots$$

$$\frac{V_1 - \frac{V_m}{\alpha}}{Z_{m1}} + \cdots + \frac{V_n - V_m}{Z_{mn}} = 0$$

In the limit as the absolute value of the amplification factor goes to $\infty$ these equations become $$\frac{V_1}{Z_{11}} + \cdots + \frac{V_n}{Z_{1n}} = 0$$

$$\frac{V_1}{Z_{21}} + \cdots + \frac{V_n'}{Z_{2n}} = 0$$

$$\cdots$$

$$\frac{V_1}{Z_{m1}} + \cdots + \frac{V_n}{Z_{mn}} = 0$$

Hence the circuit of Figure 5 if the absolute value of $\alpha$ is large represents $m$ homogeneous linear algebraic equations in the $n$ variables $V_1$, $V_2$, ..., $V_n$ where the reciprocals $$\frac{1}{Z_{11}}, \ldots, \frac{V_n}{Z_{mn}} = 0$$

are the coefficients of the equations. By varying the voltage input of the voltage sources $G_{m+1}$, ..., $G_n$ connected to $V_{m+1}$, ..., $V_n$ all possible solutions of the three equations may be obtained by measuring with a suitable meter 30 the voltage to ground at junction points $V_1$, $V_2$, ..., $V_n$, as by a suitable selector switch 31.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. In a system for solving a linear algebraic equation in $n$ variables, an electrical network including a set of junction points one for each of said variables, another junction point, a set of impedance elements one for each coefficient of the equation directly connecting each junction point of said set of junction points with said other junction point, a source of voltage, means connecting at least one of the junction points of said set with one terminal of said voltage source, another impedance element directly connecting said other junction point with the other terminal of said voltage source, the sum of the reciprocals of the impedances connected directly to said other junction point being zero, and means for measuring the voltage between any one of said junction points of said set and said other terminal of the voltage source.

2. In the system according to claim 1, means for determining the phase relationship of the voltages appearing at two junction points of said first-mentioned set.

3. In a system for solving a linear algebraic equation in $n$ variables, an electrical network including a set of junction points one for each of said variables, another junction point, a set of impedance elements one for each coefficient of the equation directly connecting each junction point of said set of junction points with said other junction point, a source of voltage, means connecting at least one of the junction points of said set with one terminal of said voltage source, another impedance element directly connecting said other junction point with the other terminal of said voltage source, the sum of the reciprocals of the impedances connected directly to said other junction point being zero, and means for measuring the voltage between any one of said junction points of said set and said other terminal of the voltage source, said other impedance element having an impedance equal to the impedance of said set of impedance elements connected in parallel between said set of junction points and said other junction point, and an electronic impedance reversing device adapted to reverse the impedance of said other impedance element.

4. In a system for solving $m$ linear algebraic equations in $n$ variables, an electrical network including a first set of $n$ junction points comprising a first subset of $m$ junction points and a second subset of junction points where $m<n$, a second set of $m$ junction points, a set of $mn$ impedances connecting each junction point of said first set to each junction point of said second set, a set of $m$ amplifiers with high input impedance, each amplifier having a first input terminal and a first output terminal, said input and output terminals being directly connected, each amplifier having a second input terminal directly connected to a junction point of said second set of junction points, each amplifier also having a second output terminal directly connected to a junction point of said first subset of junction points, $n-m$ voltage sources each having a first terminal, and a second terminal said first terminals of said voltage sources being connected to said junction points of said second subset, and said second terminals of said voltage sources being each connected to all of said first input terminals of said amplifiers, and a voltage measuring device selectively connected to any one of said first set of $n$ junction points.

5. In a system for solving a linear algebraic equation in $n$ variables, an electrical network including a set of junction points one for each of said variables, another junction point, a set of impedance elements one for each coefficient of the equation directly connecting each junction point of said set of junction points with said other junction point, a source of voltage, means connecting at least one of the junction points of said set with one terminal of said voltage source, another impedance element having an impedance which is any predetermined positive or negative multiple of any desired impedance, said other impedance element directly connecting said other junction point with the other terminal of said voltage source, the sum of said other impedance and the reciprocals of the impedances representing the coefficients being zero, and means for measuring the voltage between any one of said junction points of said set and said other terminals of the voltage source.

6. In a system for solving a plurality of algebraic equations containing $n$ variables, an electrical network including a first set of junction points having a junction for each of said variables, a second set of junction points having a junction for each equation to be solved, a plurality of impedance elements wherein there is one for each coefficient of the equations, said impedance elements acting to connect each of the first set of junction points with all of the second set of junction points, a source of voltage, means for successively connecting each of the first set of junction points to one terminal of the voltage source, another set of impedance elements connecting the second set of junction points with the other terminal of the voltage source, there being one of said other impedance elements for each of the second junction points, the sum of the reciprocals of the impedances directly connected to each of said second set of junction points being zero, and means for measuring the voltage between each of the first set of junction points and said other terminal of the voltage source.

ANDRÉ NOËL GLEYZAL.

References Cited in the file of this patent

"Reference Data for Radio Engineers" by the Federal Telephone and Radio Corp., printed by the Knickerbocker Printing Corp., New York.

"Analysis of Problems in Dynamics by Electronic Circuits," Proceedings of the Institute of Radio Engineers and Waves and Electrons vol. 35, No. 5, May 1947.